United States Patent
Li et al.

(10) Patent No.: US 12,145,140 B2
(45) Date of Patent: Nov. 19, 2024

(54) HONEYCOMB CATALYST FOR CATALYTIC OXIDATIVE DEGRADATION OF VOCS PREPARED BY ULTRASONIC DOUBLE-ATOMIZATION PROCESS

(71) Applicant: CHANGZHOU UNIVERSITY, Jiangsu (CN)

(72) Inventors: Xiazhang Li, Changzhou (CN); Chao Yao, Changzhou (CN); Shixiang Zuo, Changzhou (CN); Xuhua Ye, Changzhou (CN); Fengqin Wu, Changzhou (CN); Haoguan Gui, Changzhou (CN); Guanghui Lu, Changzhou (CN); Liang Wang, Changzhou (CN); Zeyue Xu, Changzhou (CN)

(73) Assignee: CHANGZHOU UNIVERSITY, Changzhou (CN)

( * ) Notice: Subject to any disclaimer, the term of this patent is extended or adjusted under 35 U.S.C. 154(b) by 0 days.

(21) Appl. No.: 18/614,616

(22) Filed: Mar. 22, 2024

(65) Prior Publication Data

US 2024/0226865 A1 Jul. 11, 2024

Related U.S. Application Data

(63) Continuation-in-part of application No. PCT/CN2023/111406, filed on Aug. 7, 2023.

(30) Foreign Application Priority Data

Sep. 26, 2022 (CN) .......................... 202211174148.8

(51) Int. Cl.
*B01J 35/57* (2024.01)
*B01J 23/06* (2006.01)
(Continued)

(52) U.S. Cl.
CPC ........... *B01J 35/57* (2024.01); *B01J 37/0207* (2013.01); *B01J 37/0209* (2013.01); *B01J 37/08* (2013.01);
(Continued)

(58) Field of Classification Search
CPC .... B01J 35/57; B01J 37/0207; B01J 37/0209; B01J 37/08; B01J 2235/10; B01J 2235/15;
(Continued)

(56) References Cited

U.S. PATENT DOCUMENTS 5,851,948 A    12/1998  Chuang et al.
7,064,097 B1 *  6/2006  Cai .......................... B01J 35/60
                                                        502/343

(Continued)

FOREIGN PATENT DOCUMENTS

CN        1830529 A     9/2006
CN      101372353 A     2/2009
(Continued)

OTHER PUBLICATIONS

CN-105478134-A. (Year: 2016).*
(Continued)

*Primary Examiner* — Cam N. Nguyen
(74) *Attorney, Agent, or Firm* — PORUS IP LLC

(57) ABSTRACT

The present disclosure provides a honeycomb catalyst for catalytic oxidative degradation of VOCs prepared by an ultrasonic double-atomization process. The honeycomb catalyst is prepared by performing acidification and performing hydrothermal activation in alcoholic solution for honeycomb to modify a surface; dissolving soluble transition metal inorganic salt in deionized water to obtain precursor solution; performing ultrasonic atomization of the precursor solution and the precipitant solution in the ultra-
(Continued)

sonic atomization device into droplets; placing the modified honeycomb in a special quartz glass reactor, wherein the droplets enter into the quartz glass reactor through a pipeline to come into contact with a surface of a honeycomb hole and rapidly react to generate a hydroxide precursor on the surface of the honeycomb hole; drying the honeycomb into a drying box after performing the ultrasonic atomization, and calcining the honeycomb into a muffle furnace to obtain the honeycomb catalyst loaded with transition metal oxides.

4 Claims, 3 Drawing Sheets

(51) Int. Cl.
  *B01J 23/10* (2006.01)
  *B01J 23/34* (2006.01)
  *B01J 23/75* (2006.01)
  *B01J 23/755* (2006.01)
  *B01J 27/224* (2006.01)
  *B01J 37/02* (2006.01)
  *B01J 37/08* (2006.01)

(52) U.S. Cl.
  CPC ........ *B01J 2235/10* (2024.01); *B01J 2235/15* (2024.01); *B01J 2235/30* (2024.01)

(58) Field of Classification Search
  CPC ...... B01J 2235/30; B01J 27/224; B01J 23/06; B01J 23/10; B01J 23/34; B01J 23/75; B01J 23/755
  See application file for complete search history.

(56) References Cited

U.S. PATENT DOCUMENTS

| | | | | |
|---|---|---|---|---|
| 8,163,669 B2* | 4/2012 | Hampden-Smith | ....... | C01B 3/38 502/514 |
| 8,475,755 B2* | 7/2013 | Dang | ....... | B01J 23/63 423/247 |
| 11,643,954 B2* | 5/2023 | Dang | ....... | B01J 21/066 502/339 |
| 2008/0233039 A1* | 9/2008 | Hagemeyer | ....... | B01D 53/945 502/313 |
| 2012/0093696 A1* | 4/2012 | Mizuguchi | ....... | B01J 37/0221 422/173 |
| 2017/0101317 A1 | 4/2017 | Malaibari et al. | | |
| 2020/0061591 A1* | 2/2020 | Gao | ....... | B01J 23/75 |
| 2020/0197912 A1* | 6/2020 | Fu | ....... | B01J 37/342 |

FOREIGN PATENT DOCUMENTS

| | | | | |
|---|---|---|---|---|
| CN | 103464220 A | | 12/2013 | |
| CN | 104971724 A | | 10/2015 | |
| CN | 105478134 A | * | 4/2016 | ............. B01J 21/16 |
| CN | 106362768 A | | 2/2017 | |
| CN | 106582581 A | | 4/2017 | |
| CN | 108325526 A | | 7/2018 | |
| CN | 111068706 A | * | 4/2020 | ......... B01D 53/8621 |
| CN | 111085206 A | * | 5/2020 | |
| CN | 111359673 A | | 7/2020 | |
| CN | 112156777 A | | 1/2021 | |
| CN | 112209440 A | | 1/2021 | |
| CN | 113663707 A | | 11/2021 | |
| CN | 115445599 A | | 12/2022 | |
| WO | WO-2016041380 A1 | * | 3/2016 | ............. B01J 21/16 |

OTHER PUBLICATIONS

CN-111068706-A. (Year: 2020).*
CN-111085206-A. (Year: 2020).*
WO-2016041380-A1. (Year: 2016).*
International Search Report in PCT/CN2023/111406 mailed on Oct. 12, 2023, 8 pages.
Written Opinion in PCT/CN2023/111406 mailed on Oct. 12, 2023, 8 pages.
Notification to Grant Patent Right for Invention in Chinese Application No. 202211174148.8 mailed on Jul. 31, 2023, 8 pages.

* cited by examiner

HONEYCOMB CATALYST FOR CATALYTIC OXIDATIVE DEGRADATION OF VOCS PREPARED BY ULTRASONIC DOUBLE-ATOMIZATION PROCESS

CROSS-REFERENCE TO RELATED APPLICATION

This application is a Continuation-In-Part of International Application No. PCT/CN2023/111406, filed Aug. 7, 2023, which claimed priority to Chinese application No. 202211174148.8, filed Sep. 26, 2022, the entire contents of which are incorporated herein by reference.

TECHNICAL FIELD

The present disclosure relates to a technical field of monolithic catalyst preparation, and in particular, to a honeycomb catalyst for catalytic oxidative degradation of volatile organic compounds (VOCs) prepared by an ultrasonic double-atomization process.

BACKGROUND

With rapid development of industries such as petrochemicals, spraying, footwear and printing, emissions of VOCs represented by aromatic organic compounds gradually increases, which may pose a great threat to the environment, animal and plant growth and human health. Currently, processes for removing the volatile organic compounds include an adsorption process, a direct incineration process, a photocatalytic process, and a catalytic oxidation process, and the catalytic oxidation technology has become research of the current organic waste gas treatment industry for features of high purification rate, no secondary pollution and low energy consumption. A preparation of cheap and efficient catalysts is a core of the catalytic oxidation technology.

Monolithic catalysts are a class of catalysts in which active components are loaded on an integral carrier. A cross-section of early developed ceramic carrier catalysts is a honeycomb structure, so the monolithic catalyst is also known as a honeycomb catalyst. The monolithic catalyst has advantages of fast mass transfer rate, small amplification effect, high recycling rate, superior performance beyond traditional granular catalysts, and close to actual conditions of engineering. At present, the monolithic catalyst is usually prepared by a coating process, while a carrier surface of the monolithic catalyst prepared by the coating process is not uniformly coated, and the adhesion is poor.

Therefore, it is desired to provide a monolithic catalyst with relatively small particle of active component, uniform distribution, good adhesion, and green economy.

SUMMARY

One or more embodiments of the present disclosure provide a honeycomb catalyst for catalytic oxidative degradation of Volatile Organic Compounds (VOCs) prepared by an ultrasonic double-atomization process, preparation operations of the honeycomb catalyst may include:
(1) placing honeycomb in nitric acid solution with mass concentration of 5%-15% for acidification for 6-18 h, cleaning and naturally drying the honeycomb after removal from the nitric acid solution, placing the honeycomb in a hydrothermal reactor, adding alcoholic solution for hydrothermal activation, temperature of the hydrothermal activation is 120-180° C., and time of the hydro-thermal activation is 6-18 h, naturally drying the honeycomb after performing the hydrothermal activation and removal from the hydrothermal reactor; wherein the honeycomb is attapulgite honeycomb, cordierite honeycomb, mullite, or silicon carbide honeycomb; the alcohol solution is ethanol solution with mass concentration of 25%-75%;
(2) dissolving soluble transition metal inorganic salt in deionized water and stirring thoroughly to obtain precursor solution; preparing precipitant solution; performing ultrasonic atomization of the precursor solution and the precipitant solution in the ultrasonic atomization device into droplets, and placing the honeycomb in a special quartz glass reactor, wherein the droplets enter into the quartz glass reactor through a pipeline to come into contact with a surface of a honeycomb hole and rapidly react to generate a hydroxide precursor on the surface of the honeycomb hole; wherein the soluble transition metal inorganic salt is cobalt salt, manganese salt, cerium salt, nickel salt, or zinc salt;
(3) drying the honeycomb into a drying box after performing the ultrasonic atomization, and calcining the honeycomb into a muffle furnace to obtain the honeycomb catalyst loaded with transition metal oxides.

In some embodiments, the precipitant solution is ammonia water with concentration of 0.6-4.8 mol/L; a molar concentration ratio between the soluble transition metal inorganic salt and the ammonia water is 1:x, wherein x is between 3 and 12.

In some embodiments, an oscillation frequency of the ultrasonic atomization device in the operations (2) is 1.7-2.4 MHz; and time of the ultrasonic atomization is 1-5 h.

In some embodiments, the temperature of the muffle furnace calcination in the operation (3) is 300-800° C., a heating rate is 2-5° C./min; calcination time is 1-5 h, and the honeycomb catalyst cooled down to room temperature with the furnace after calcining.

BRIEF DESCRIPTION OF THE DRAWINGS

The present disclosure is further describable in terms of exemplary embodiments. These exemplary embodiments are describable in detail with reference to the drawings. These embodiments are non-limiting exemplary embodiments, in which like reference numerals represent similar structures throughout the several views of the drawings, and wherein.

DETAILED DESCRIPTION

Figure 1:
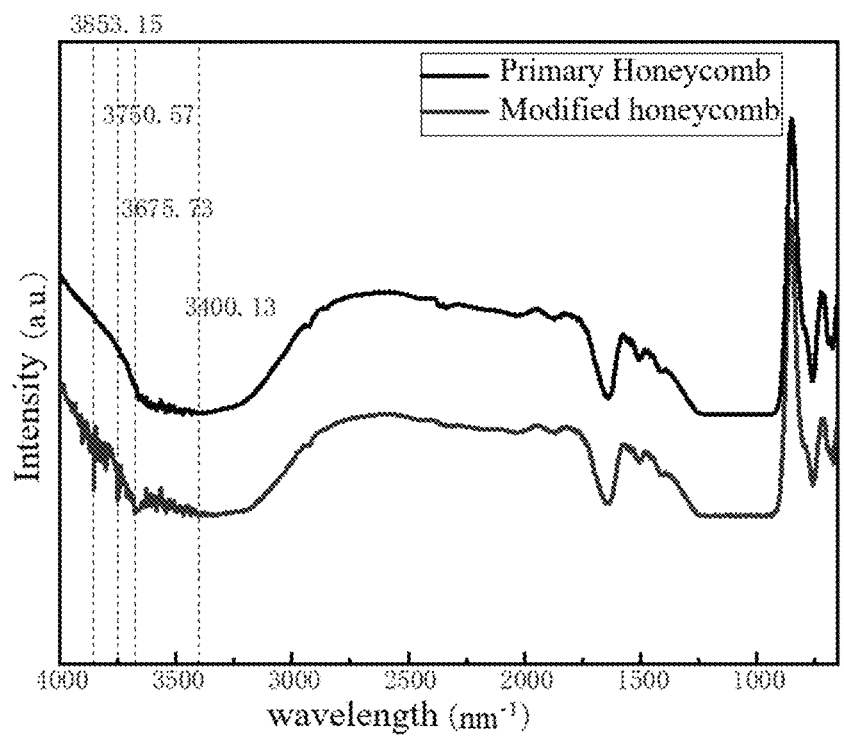
FIG. 1 is an infrared spectral spectrum illustrating honeycomb before and after modification according to some embodiments of the present disclosure.
Figure 2:
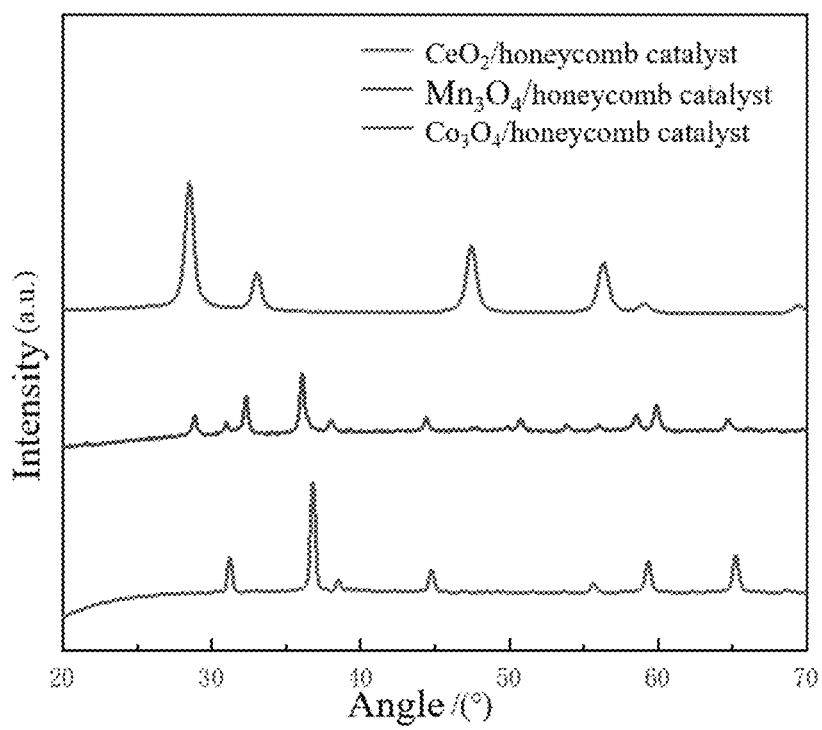
FIG. 2 is an X-ray diffraction (XRD) image illustrating honeycomb shown in embodiments 1-3 according to some embodiments of the present disclosure.
Figure 3:
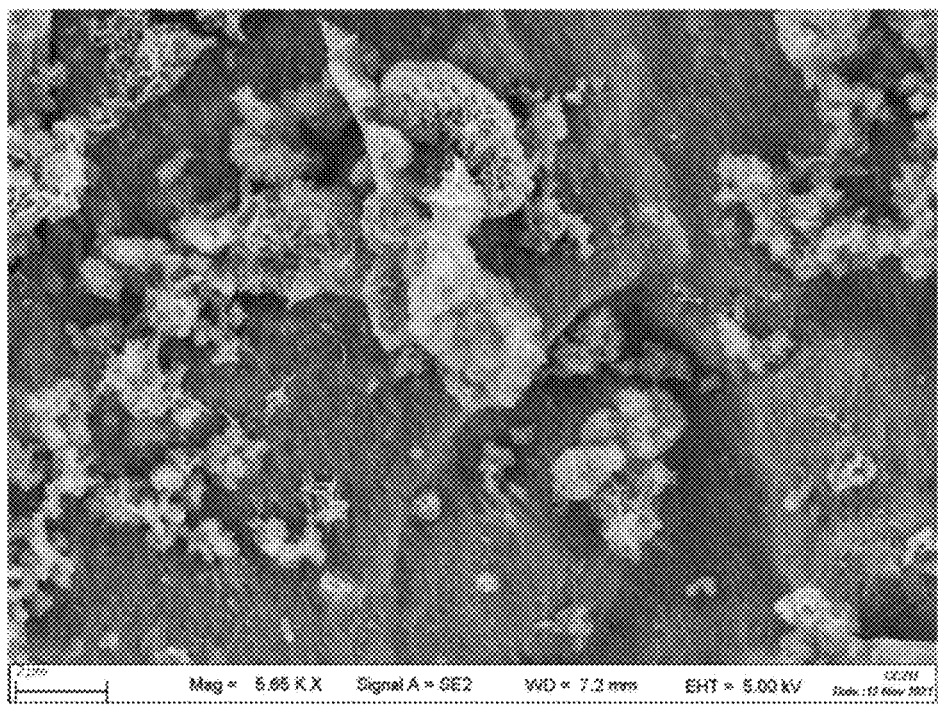
FIG. 3 is a scanning electron microscope (SEM) image illustrating a surface of a $Co_3O_4$/honeycomb catalyst obtained according to an embodiment 1 of the present disclosure.
Figure 4:
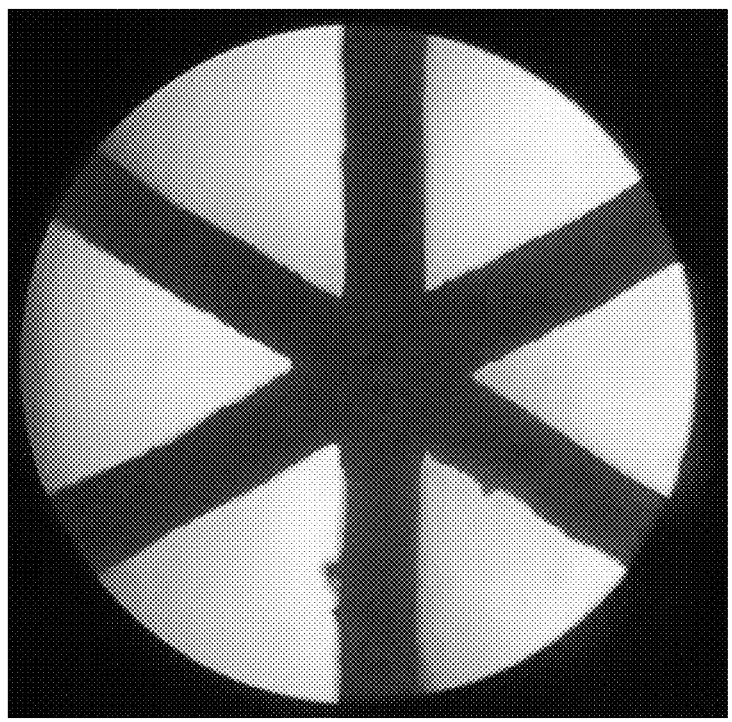
FIG. 4 is an optical microscope (OM) view illustrating a surface of a $Co_3O_4$/honeycomb catalyst obtained according to an embodiment of the present disclosure.
Figure 5:
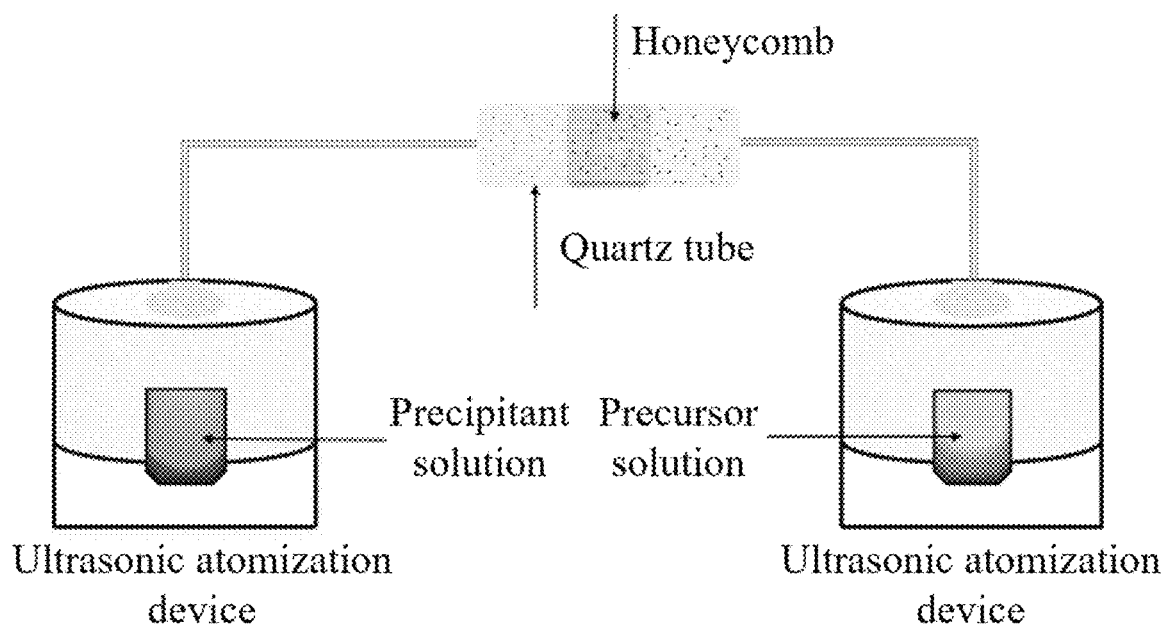
FIG. 5 is an exemplary schematic diagram illustrating an ultrasonic double-atomization process for preparing a honeycomb catalyst according to some embodiments of the present disclosure.

In order to more clearly illustrate the technical solutions of the embodiments of the present disclosure, the accompanying drawings required to be used in the description of the embodiments are briefly described below. Obviously, the accompanying drawings in the following description are only some examples or embodiments of the present disclosure, and it is possible for a person of ordinary skill in the art to apply the present disclosure to other similar scenarios in accordance with these drawings without creative labor. The present disclosure can be applied to other similar scenarios based on these drawings without creative labor. Unless obviously obtained from the context or the context illustrates otherwise, the same numeral in the drawings refers to the same structure or operation.

The terminology used herein is to describe particular example embodiments only and is not intended to be limiting. As used herein, the singular forms "a", "an", and "the" may be intended to include the plural forms as well, unless the context clearly indicates otherwise. It will be further understood that the terms "comprises", "comprising", "includes" and/or "including" when used in this specification, specify the presence of stated features, integers, steps, operations, elements, and/or components, but do not preclude the presence or addition of one or more other features, integers, steps, operations, elements, components, and/or groups thereof.

One or more embodiments of the present disclosure provide a honeycomb catalyst for catalytic oxidative degradation of Volatile Organic Compounds (VOCs) prepared by an ultrasonic double-atomization process, wherein preparation operations of the honeycomb catalyst include:

(1) honeycomb may be placed in nitric acid solution with mass concentration of 5%-15% for acidification for 6-18 h, the honeycomb may be cleaned and naturally dried after removal from the nitric acid solution, the honeycomb may be placed in a hydrothermal reactor, alcoholic solution may be added for hydrothermal activation, temperature of the hydrothermal activation is 120-180° C., and time of the hydro-thermal activation is 6-18 h, the honeycomb may be naturally dried after performing the hydrothermal activation and removal from the hydrothermal reactor.

In some embodiments, the honeycomb may be attapulgite honeycomb, cordierite honeycomb, mullite, or silicon carbide honeycomb.

The acidification process may dissolve metal ions from the honeycomb surface, reduce a combination of hydroxyl groups on the honeycomb surface with metal ion impurities, and improve a specific surface area and pore volume of the honeycomb surface.

In some embodiments, the honeycomb may be subjected to acidification, mass concentration of the nitric acid solution may be 5-15%, and an acidification time may be 6-18 h. In some embodiments, the honeycomb may be subjected to acidification, and the mass concentration of the nitric acid solution may be 5%, 8%, 10%, 12%, or 15%.

The honeycomb surface after adding alcoholic solution for hydrothermal activation contains a large number of hydroxyl groups, which can reduce a water contact angle of the honeycomb, increase the surface energy, and provide a good hydrophilic reaction environment, which is conducive to a loading of ions from ultrasonic double-atomization precursor solution, i.e., the metal ions and hydroxide ions are deposited and contacted on the honeycomb surface, which may generate more oxygen vacancy defects conducive to the catalytic oxidation reaction. The hydrothermal activation has low activation temperature and low energy consumption. The alcohol solution used in the reaction may be recycled and used, which is green and environmentally friendly.

In some embodiments, the alcohol solution is an ethanol solution with mass concentration of 25-75%.

In some embodiments, the mass concentration of the ethanol solution may also be 15%, 35%, 50%, or 75%.

(2) soluble transition metal inorganic salt may be dissolved in deionized water and stirring thoroughly to obtain precursor solution; precipitant solution may be prepared; ultrasonic atomization may be performed on the precursor solution and the precipitant solution in the ultrasonic atomization device into droplets, and the honeycomb may be placed in a special quartz glass reactor, wherein the droplets enter into the quartz glass reactor through a pipeline to come into contact with a surface of a honeycomb hole and rapidly react to generate a hydroxide precursor on the surface of the honeycomb hole; wherein the soluble transition metal inorganic salt is cobalt salt, manganese salt, cerium salt, nickel salt, or zinc salt.

In some embodiments, the soluble transition metal inorganic salt may be cobalt salt, manganese salt, cerium salt, nickel salt, or zinc salt The precursor solution refers to a solution obtained by formulating the soluble transition metal inorganic salt and the deionized water and is used as one of the two types of reaction solution for preparing the honeycomb catalysts by the ultrasonic double-atomization process.

In some embodiments, the precipitant solution is ammonia water with concentration of 0.6-4.8 mol/L. In some embodiments, molar concentration of ammonia water may be 0.6 mol/L, 0.75 mol/L, 1.5 mol/L, 2.25 mol/L, or 4.8 mol/L.

In some embodiments, a molar concentration ratio between the soluble transition metal inorganic salt and the ammonia water is 1:x, wherein x is between 3 and 12.

In some embodiments, the process of the performing the ultrasonically atomization on the precursor solution and the precipitant solution into fog droplets by placing the precursor solution and the precipitant solution in an ultrasonic atomization device, respectively further includes: determining a size of an atomized particle by using a processor and sending an instruction for generating the size of the atomized particle to an ultrasonic atomization device, atomizing the obtained precursor solution and precipitant solution into atomized particle-sized precursor droplets and precipitant droplets, respectively by using the ultrasonic atomization device.

In some embodiments, the processor is located at a terminal.

The size of atomized particle is a particle size of the droplet formed after the precursor solution and precipitant solution have been atomized by the ultrasonic atomization device.

The precursor droplets are atomized particles that are formed when the precursor solution is atomized.

The precipitant droplets are atomized particles formed when the precipitant solution is atomized.

In some embodiments, the size of the atomized particle may be determined in a variety of ways. For example, the size of the atomized particle may be determined by a user via processor input.

In some embodiments, the size of the atomized particle may also be determined by an atomized particle determination model. The atomized particle determination model may be a machine learning model, such as a neural network model (Neural Networks, NN), or the like.

In some embodiments, an input to the atomized particle determination model may include a precursor solution parameter, a precipitant solution parameter, an ultrasonic atomization device parameter, and ambient temperature.

The precursor solution parameter is a parameter related to properties of the precursor solution. The precursor solution parameter may include precursor solution solute content, solute type, solution temperature, or the like.

The precipitant solution parameter is a parameter related to properties of the precipitant solution. The precipitant solution parameter may include precipitant solution solute content, solute type, and solution temperature.

The ultrasonic atomization device parameter is a parameter when performing the ultrasonic atomization device, such as an oscillation frequency, a time, or the like.

In some embodiments, the oscillation frequency of the ultrasonic atomization device may be 1.7-2.4 MHZ. In some embodiments, the oscillation frequency of the ultrasonic atomization device may also be 1.7 MHz, 2.0 MHz, or 2.4 MHZ.

In some embodiments, the time of ultrasonic atomization may be 1-5 h. In some embodiments, the time of ultrasonic atomization may also be 1 h, 5 h.

The ambient temperature is temperature of environment where the reactor is located.

In some embodiments, an output of the atomized particle determination model may include a size of the atomized particle.

In some embodiments, the atomized particle determination model may be obtained by training based on a large number of first training samples with a first label.

In some embodiments, the first training samples may include a precursor solution parameter, a precipitant solution parameter, an ultrasonic atomization device parameter, and ambient temperatures from a historical database.

In some embodiments, the honeycomb catalyst obtained by atomized particles with different sizes during model training into use, and an atomized particle size corresponding to a honeycomb catalyst with a best result may be labeled as the first label. In some embodiments, the first label may be obtained by manual labeling.

In some embodiments, an using effectiveness of the honeycomb catalyst is positively correlated with the amount of the reaction for catalytic oxidative degradation of the VOCs and efficiency of the catalytic reaction. For example, the using effectiveness of the honeycomb catalyst may be determined according to equation (1):

$$\text{The sing effectiveness} = W1 * \text{The amount of the reaction for catalytic oxidative degradation of the } VOCs + W2 * \text{The fficiency of the catalytic reaction.}$$

Wherein W1 and W2 may be obtained based on a manual preset.

In some embodiments, the droplets enter into the quartz glass reactor through a pipeline to come into contact with a surface of a honeycomb hole and rapidly react further includes: the precursor droplets enter the reactor through a first pipeline, and the precipitant droplets enter the reactor through a second pipeline, and there is a first time difference between an opening time of the first pipeline and the second pipeline.

In some embodiments, the first time difference may be determined in a variety of ways. For example, the first time difference may be determined by a user via processor input.

In some embodiments, the first time difference may also be determined by a first time difference determination model. The first time difference determination model may be a machine learning model, such as a neural network model, or the like.

In some embodiments, an input to the first time difference determination model may include a size of the atomized particle, ambient temperature, a precursor solution parameter, a precipitant solution parameter, and a distance of the first pipeline/second pipeline from the honeycomb surface.

In some embodiments, an output of the first time-difference determination model may include a first time difference.

In some embodiments, the first time difference determination model may be obtained from a plurality of second training samples with a second label.

In some embodiments, the second training sample may include a size of the atomized particle from historical data, ambient temperature, a precursor solution parameter, a precipitant solution parameter, and a distance of the first pipeline/second pipeline from the honeycomb surface.

In some embodiments, the honeycomb catalyst obtained by production at various first time differences in model training data are evaluated for quality, and a first time difference corresponding to a best-quality honeycomb catalyst may be used as a second label. In some embodiments, the second label may be obtained by manual labeling.

In some embodiments, the quality of the honeycomb catalyst may be assessed by counting a particle size of oxide particles on the honeycomb surface and the agglomeration condition. The agglomeration condition refers to a clumping of the chemical reactants on the honeycomb surface. In some embodiments, the agglomeration condition may be represented by a ratio of an agglomeration threshold to the count of agglomerates, where the smaller the ratio, the worse the agglomeration condition.

In some embodiments, there is a positive correlation between the quality of the honeycomb catalyst and the oxide particle size and agglomeration. For example, the quality of the honeycomb catalyst may be evaluated according to an equation (2):

$$\text{The quality of the honeycomb catalyst} = k1 * \text{the standard particle} \frac{\text{size}}{\text{the}} \text{ oxide particle size} + k2 * \text{the aggregation threshold/the count of aggregates;}$$

Wherein k1, k2, the standard particle size, and the agglomeration threshold may be obtained by manual presetting.

(3) the honeycomb may be dried into a drying box after performing the ultrasonic atomization, and calcining the honeycomb into a muffle furnace to obtain the honeycomb catalyst loaded with transition metal oxides.

In some embodiments, a calcination temperature of the muffle furnace may be 300-800° C. In some embodiments, the calcination temperature of the muffle furnace may be 300° C., 400° C., 500° C., or 800° C.

In some embodiments, a heating rate of a calcination process may be 2-5° C./min.

In some embodiments, the heating rate of the calcination process may be 2° C./min, 3° C./min, or 5° C./min.

In some embodiments, a calcination time may be 1-5 h. In some embodiments, the calcination time may be 1 h, 2 h, or 5 h.

In some embodiments, the honeycomb catalyst may be cooled down to room temperature with the muffle furnace after calcination is complete.

The beneficial effects of embodiments of the present disclosure include, but are not limited to, (1) performing acid treatment for the honeycomb carrier to increase a specific surface area of the honeycomb and providing more attachment sites for the uniform distribution of hydroxyl groups and active components. Then the honeycomb carrier may be activated by alcohol, so that there are a large count of hydroxyl groups on the honeycomb surface, which provides a good reaction environment for the deposition of metal ions; (2) the honeycomb catalyst prepared by ultrasonic double-atomization technology, the active components may grow on the honeycomb surface in situ, and the oxide nanoparticles of the honeycomb catalyst have a higher collection efficiency, a uniform particle size and no agglomeration, which is not only conducive to the dispersion, but also improves the bonding strength of the active component and the honeycomb carrier, generating more oxygen vacancy defects and facilitating the catalytic oxidation reaction with higher activity. This not only facilitates dispersion, but also improves the bonding strength between the active components and the honeycomb carrier, generating more oxygen vacancy defects, which is conducive to the catalytic oxidation reaction, and the catalytic oxidation activity of VOCs is higher.

The use of the honeycomb catalyst prepared by the ultrasonic double-atomization and the catalytic oxidative degradation of VOCs provided by embodiments of the present disclosure is further illustrated below by way of specific embodiments.

EMBODIMENTS

Embodiment 1

1. The honeycomb may be acidified in nitric acid solution with 8% mass concentration, and cleaned and dried. The honeycomb may be placed in a reactor for hydrothermal activation by adding ethanol solution with 50% mass concentration, and then removed to dry.
2. 1.45 g of $Co(NO_3)_2 \cdot 6H_2O$ may be weighed and dissolved in 20 ml of deionized water and stirred hydrothermally at 30° C. for 10 min to obtain precursor solution with molar concentration of 0.25 mol/L. The precursor solution may be extracted from the mixture and stirred at 30° C. for 10 min. Another 2 ml of concentrated ammonia solution may be taken and diluted by adding 20 ml of deionized water to obtain precipitant solution with 1.5 mol/L molar concentration. A ratio of the molar concentration of $[Co^{2+}]$:$[NH_3—H_2O]$ may be 1:6.
3. The surface-modified honeycomb may be placed in a quartz glass reactor, and the precursor solution and the precipitant solution may be placed in the ultrasonic atomization device to atomize, respectively, and the atomized droplets may enter into the reactor, and the droplets may come into contact with a surface of a honeycomb hole and reacted to the honeycomb surface to generate hydroxide, wherein the oscillation frequency of the ultrasonic device may be 2.0 MHz and the time of ultrasonic atomization may be 3 h.
4. The honeycomb after performing the ultrasonic atomization may be dried in a blast drying oven, and then calcined in the muffle furnace at 500° C. for 2 h with a heating rate of 2° C./min to obtain the $Co_3O_4$/honeycomb catalyst.
5. Finally, the $Co_3O_4$/honeycomb catalyst may be placed in a quartz tube of the evaluation device, and a p-xylene may be bubbled through $N_2$, and air may be used as equilibrium gas, and the gases may enter into the reaction device at the same time, and an initial concentration of the p-xylene may be tested first, and after that, the reaction furnace may be warmed up. After that, the reactor may be warmed up, and the real-time concentration may be recorded at intervals of 10° C. to calculate a degradation rate of the p-xylene. Generally, the ability to degrade paraxylene may be evaluated in terms of the level of temperature at which the degradation rate reaches 90%, i.e. T90. The $T_{90}$ of the $Co_3O_4$/honeycomb catalyst may be tested to be 318° C. by the above process.

Embodiment 2

1. The honeycomb may be acidified in nitric acid solution with 10% mass concentration, and cleaned and dried. The honeycomb may be placed in a reactor for hydrothermal activation by adding ethanol solution with 50% mass concentration, and then removed to dry.
2. 2.17 g of $Ce(NO_3)_3 \cdot 6H_2O$ may be weighed and dissolved in 20 ml of deionized water and stirred hydrothermally at 30° C. for 10 min to obtain precursor solution with molar concentration of 0.25 mol/L. The ammonia aqueous solution of 2 ml may be taken to add into 20 ml of distilled water for diluting to obtain a precipitant solution with molar concentration of 2.25 mol/L A ratio of the molar concentration of $[Co^{2+}]$:$[NH_3—H_2O]$ may be 1:6.
3. The surface-modified honeycomb may be placed in a quartz glass reactor, and the precursor solution and the precipitant solution may be placed in the ultrasonic atomization device to atomize, respectively, and the atomized droplets may enter into the reactor, and the droplets may come into contact with a surface of a honeycomb hole and reacted to the honeycomb surface to generate hydroxide, wherein the oscillation frequency of the ultrasonic device may be 1.7 MHz and the time of ultrasonic atomization may be 5 h.
4. The honeycomb after performing the ultrasonic atomization may be dried in a blast drying oven, and then calcined in the muffle furnace at 800° C. for 2 h with a heating rate of 3° C./min to obtain the $Co_3O_4$/honeycomb catalyst.
5. Finally, the $Co_3O_4$/honeycomb catalyst may be placed in the quartz tube of the evaluation device and evaluated for the catalytic oxidative degradation of paraxylene as in the embodiment 1. The $T_{90}$ of the $CeO_2$/honeycomb catalyst tested by above process may be 325° C.

Embodiment 3

1. The honeycomb may be acidified in nitric acid solution with 10% mass concentration, and cleaned and dried. The honeycomb may be placed in a reactor for hydrothermal activation by adding ethanol solution with 50% mass concentration, and then removed to dry.
2. 1.26 g of $Mn(NO_3)_2 \cdot 6H_2O$ may be weighed and dissolved in 20 ml of deionized water and stirred hydrothermally at 30° C. for 10 min to obtain precursor solution with molar concentration of 0.25 mol/L. The ammonia aqueous solution of 1 ml may be taken to add into 20 ml of distilled water for diluting to obtain a precipitant solution with molar concentration of 0.75 mol/L. A ratio of the molar concentration of $[Mn^{2+}]$:$[NH_3-H_2O]$ may be 1:3.
3. The surface-modified honeycomb may be placed in a quartz glass reactor, and the precursor solution and the precipitant solution may be placed in the ultrasonic atomization device to atomize, respectively, and the atomized droplets may enter into the reactor, and the droplets may come into contact with a surface of a honeycomb hole and reacted to the honeycomb surface to generate hydroxide, wherein the oscillation frequency of the ultrasonic device may be 2.4 MHz and the time of ultrasonic atomization may be 1 h.
4. The honeycomb after performing the ultrasonic atomization may be dried in a blast drying oven, and then calcined in the muffle furnace at 400° C. for 1 h with a heating rate of 2° C./min to obtain the $Mn_3O_4$/honeycomb catalyst.
5. Finally, the $Mn_3O_4$/honeycomb catalyst may be placed in the quartz tube of the evaluation device and evaluated for the catalytic oxidative degradation of paraxylene as in the embodiment 1. The $T_{90}$ of the $CeO_2$/honeycomb catalyst tested by above process may be 328° C.

Embodiment 4

1. The honeycomb may be acidified in nitric acid solution with 12% mass concentration, and cleaned and dried. The honeycomb may be placed in a reactor for hydrothermal activation by adding ethanol solution with 75% mass concentration, and then removed to dry.
2. 0.58 g of $Ni(NO_3)_2 \cdot 6H_2O$ may be weighed and dissolved in 20 ml of deionized water and stirred hydrothermally at 30° C. for 10 min to obtain precursor solution with molar concentration of 0.10 mol/L. The ammonia aqueous solution of 0.8 ml may be taken to add into 20 ml of distilled water for diluting to obtain a precipitant solution with molar concentration of 0.60 mol/L. A ratio of the molar concentration of $[Ni^{2+}]$:$[NH_3-H_2O]$ may be 1:6.
3. The surface-modified honeycomb may be placed in a quartz glass reactor, and the precursor solution and the precipitant solution may be placed in the ultrasonic atomization device to atomize, respectively, and the atomized droplets may enter into the reactor, and the droplets may come into contact with a surface of a honeycomb hole and reacted to the honeycomb surface to generate hydroxide, wherein the oscillation frequency of the ultrasonic device may be 2.0 MHz and the time of ultrasonic atomization may be 3 h.
4. The honeycomb after performing the ultrasonic atomization may be dried in a blast drying oven, and then calcined in the muffle furnace at 300° C. for 1 h with a heating rate of 5° C./min to obtain the NiO/honeycomb catalyst.
5. Finally, the NiO/honeycomb catalyst may be placed in the quartz tube of the evaluation device and evaluated for the catalytic oxidative degradation of paraxylene as in the embodiment 1. The $T_{90}$ of the NiO/honeycomb catalyst tested by above process may be 337° C.

Embodiment 5

1. The honeycomb may be acidified in nitric acid solution with 15% mass concentration, and cleaned and dried. The honeycomb may be placed in a reactor for hydrothermal activation by adding ethanol solution with 15% mass concentration, and then removed to dry.
2. 2.33 g of $Co(NO_3)_2 \cdot 6H_2O$ may be weighed and dissolved in 20 ml of deionized water and stirred hydrothermally at 30° C. for 10 min to obtain precursor solution with molar concentration of 0.4 mol/L. The ammonia aqueous solution of 5 ml may be taken to add into 20 ml of distilled water for diluting to obtain a precipitant solution with molar concentration of 4.8 mol/L. A ratio of the molar concentration of $[Co^{2+}]$:$[NH_3-H_2O]$ may be 1:12.
3. The surface-modified honeycomb may be placed in a quartz glass reactor, and the precursor solution and the precipitant solution may be placed in the ultrasonic atomization device to atomize, respectively, and the atomized droplets may enter into the reactor, and the droplets may come into contact with a surface of a honeycomb hole and reacted to the honeycomb surface to generate hydroxide, wherein the oscillation frequency of the ultrasonic device may be 1.7 MHz and the time of ultrasonic atomization may be 1 h.
4. The honeycomb after performing the ultrasonic atomization may be dried in a blast drying oven, and then calcined in the muffle furnace at 400° C. for 2 h with a heating rate of 2° C./min to obtain the $Co_3O_4$/honeycomb catalyst.
5. Finally, the $Co_3O_4$/honeycomb catalyst may be placed in the quartz tube of the evaluation device and evaluated for the catalytic oxidative degradation of paraxylene as in the embodiment 1. The Top of the $Co_3O_4$/honeycomb catalyst tested by above process may be 330° C.

Comparative Embodiment 1

The honeycomb may be cleaned and dried without any modification treatment, and the rest of experimental operations may be consistent with the embodiment 1. Finally, the $Co_3O_4$/the primary honeycomb may be placed in the quartz tube of the evaluation device, and the catalytic oxidative degradation of paraxylene may be evaluated as in the embodiment 1. The $T_{90}$ of the $Co_3O_4$/honeycomb catalyst tested by above process may be 390° C.

The comparative embodiment 1 with the embodiment 1, a collection rate of the honeycomb catalyst without surface modification may be poor because the honeycomb surface without surface modification has a smooth surface and poor adhesion, and the effect of performing ultrasonic double-atomization deposition directly may be poor. According to the embodiment 1, the honeycomb may be acidified in nitric acid solution, cleaned and dried, and perform the hydrothermal activation on the honeycomb surface by using the ethanol. The modified honeycomb surface contains a large count of hydroxyl groups, which reduces the water contact angle of the honeycomb, increases the surface energy, and provides a good hydrophilic reaction environment conducive to the loading of ions from the ultrasonic double-atomization precursor solution. At the same time, the honeycomb surface modification can improve the adsorption of honeycomb, which is favorable to the adsorption of VOCs gases, the hydrophilicity time of ethanol modification is more reasonable, and with the prolongation of the use of time, the small molecules may be desorbed very quickly, and hydrophilicity disappears, which is favorable to the deposition and contact of active components in the ultrasonic double atomization stage, and does not have a negative impact on the catalytic oxidation of VOCs. Therefore, the preparation of oxide honeycomb catalysts by ultrasonic double atomization requires surface modification of the honeycombs. FIG. 1 is an infrared spectral spectrum illustrating honeycomb before and after modification according to some embodiments of the present disclosure, and the surface-modified honeycomb has a hydroxyl vibration around wavelength 3600 $cm^{-1}$.

Comparative Embodiment 2

T The honeycomb may be cleaned and dried, acidified in nitric acid solution with 8% mass concentration, and cleaned and dried without activation treatment, and the rest of experimental operations may be consistent with the embodiment 1. Finally, the $Co_3O_4$/the primary honeycomb may be placed in the quartz tube of the evaluation device, and the catalytic oxidative degradation of paraxylene may be evaluated as in the embodiment 1. The $T_{90}$ of the $Co_3O_4$/honeycomb catalyst tested by above process may be 360° C.

Compared the comparative embodiment 2 with the embodiment 1, simple acid modification can increase the specific surface area and pore volume of the honeycomb surface, but there is no obvious hydroxyl reactive group on the honeycomb surface that can promote ultrasonic double-atomization droplet deposition and ionic contact. Therefore, the alcohol activation treatment for the honeycomb surface is required to promote droplet deposition and ionic reaction.

Comparative Embodiment 3

The honeycomb was cleaned, dried without acid treatment, the honeycomb may be directly placed in the reactor, ethanol solution with 50% mass concentration may be added to submerge the honeycomb, and the honeycomb may perform the hydrothermal activation and then removed for drying, and the rest of the operations is the same as the embodiment 1. Finally, the $Co_3O_4$/OH-honeycomb monolithic catalyst may be placed in the quartz tube of the evaluation device, and the catalytic oxidative degradation of paraxylene may be evaluated as in the embodiment 1. The $T_{90}$ of the $Co_3O_4$/OH-honeycomb catalyst tested by above process may be 350° C.

Compared the comparative embodiment 3 with the embodiment 1, the honeycomb may only perform the alcohol activation treatment, since the honeycomb surface includes metal ions such as magnesium, aluminum, or the like, and if there is no acidification and only alcohol activation, the surface hydroxyl group is easy to be combined with the metal ion impurities, and has an effect on the subsequent ultrasonic double-atomization of the honeycomb carrier. Therefore, it is necessary to acidify the surface to dissolve the metal ions before alcohol activation.

Comparative Embodiment 4

1. The honeycomb may be acidified in nitric acid solution with 8% mass concentration, and cleaned and dried. The honeycomb may be placed in a reactor for hydrothermal activation by adding ethanol solution with 50% mass concentration, and then removed to dry.
2. 1.45 g of $Co(NO_3)_2 \cdot 6H_2O$ may be weighed and dissolved in 20 ml of deionized water and stirred hydrothermally at 30° C. for 10 min to obtain precursor solution with molar concentration of 0.25 mol/L. The ammonia aqueous solution of 2 ml may be taken to add into 20 ml of distilled water for diluting to obtain a precipitant solution with molar concentration of 0.4 mol/L. A ratio of the molar concentration of $[Co^{2+}]$:$[NH_3—H_2O]$ may be 1:6.
3. Ammonia aqueous solution may be added to cobalt nitrate solution and may be stirred at 65° C. for 2 hours to obtain the precursor solution.
4. the surface-modified honeycomb may be immersed in a beaker containing the precursor solution, the active component may deposit on the honeycomb surface, and the immersion time is 1-2 hours;
5. The honeycomb after performing the immersion may be dried in a blast drying oven, and then calcined in the muffle furnace at 500° C. for 2 h with a heating rate of 2° C./min to obtain the $Co_3O_4$/honeycomb catalyst.
6. Finally, the $Co_3O_4$/honeycomb catalyst may be placed in the quartz tube of the evaluation device and evaluated for the catalytic oxidative degradation of paraxylene as in the embodiment 1. The $T_{90}$ of the $Co_3O_4$/honeycomb catalyst tested by above process may be 385° C.

Compared the comparative embodiment 4 with the embodiment 1, the honeycomb surface catalyst obtained by the i immersion has poor adhesion of the active component, uneven distribution, large active component particles, and a large paint loss rate. Therefore, the performance of the catalytic oxidative degradation of paraxylene of the $Co_3O_4$/honeycomb catalyst obtained by the ultrasonic double atomization process is relatively better.

Comparative Embodiment 5

1. The honeycomb may be acidified in nitric acid solution with 8% mass concentration, and cleaned and dried. The honeycomb may be placed in a reactor for hydrothermal activation by adding ethanol solution with 50% mass concentration, and then removed to dry.
2. 1.45 g of $Co(NO_3)_2 \cdot 6H_2O$ may be weighed and dissolved in 20 ml of deionized water and stirred hydrothermally at 30° C. for 10 min to obtain precursor solution with molar concentration of 0.25 mol/L. The ammonia aqueous solution of 2 ml may be taken to add into 20 ml of distilled water for diluting to obtain a precipitant solution with molar concentration of 0.4 mol/L. A ratio of the molar concentration of $[Co^{2+}]$:$[NH_3—H_2O]$ may be 1:6.
3. Ammonia aqueous solution may be added to cobalt nitrate solution and may be stirred at 65° C. for 2 hours to obtain the precursor solution.
4. the surface-modified honeycomb may be immersed in the quartz glass reactor, the precursor solution may be atomized in the ultrasonic atomization device, and the atomized droplets may enter into the reactor, wherein the oscillation frequency of the ultrasonic atomization device is 2.0 MHz, and the ultrasonic atomization time is 3 hours;
5. The honeycomb after performing the atomization may be dried in a blast drying oven, and then calcined in the muffle furnace at 500° C. for 2 h with a heating rate of 2° C./min to obtain the $Co_3O_4$/honeycomb catalyst.

6. Finally, the $Co_3O_4$/honeycomb catalyst may be placed in the quartz tube of the evaluation device and evaluated for the catalytic oxidative degradation of paraxylene as in the embodiment 1. The $T_{90}$ of the $Co_3O_4$/honeycomb catalyst tested by above process may be 375° C.

Compared the comparative embodiment 5 with the embodiment 1, the ultrasonically mono-atomized precursor solution is suspension solution with lower atomized effluent, larger particles of the honeycomb surface active component, poorer dispersion, poorer adhesion, and lower paint utilization. Therefore, the performance of catalytic oxidative degradation of paraxylene using $Co_3O_4$/honeycomb catalyst obtained by ultrasonic double-atomization is relatively better.

Comparative Embodiment 6

Compared with the embodiments 1, the difference is that: the honeycomb may be placed in the reactor first, the ethanol solution with 50% mass concentration may be added to submerge the honeycomb, and and the honeycomb may be taken out to dry after performing hydrothermal activation; then the alcohol-activated honeycomb may be acidified in nitric acid solution with 8% mass concentration, cleaned and dried, and the other operations are the same as those of embodiment 1, and after testing by the above process, the $T_{90}$ of the honeycomb catalyst is 358° C. The performance of catalytic oxidative degradation of paraxylene using honeycomb catalyst obtained by the comparative embodiment 6 decreases obviously, which indicates that the honeycomb catalyst obtained by acidification treatment first and alcohol activation treatment secondly has a better performance of catalytic oxidative degradation of paraxylene.

As described above, the honeycomb catalyst prepared using the ultrasonic double-atomization process provided in one or more embodiments of the present disclosure are all single-component oxide honeycomb catalyst, however, the practical application is not limited to single-component oxides, and the technological process may prepare multi-component oxide honeycomb catalysts. In addition, the catalytic oxidation of VOCs may include but is not limited to paraxylene, professional and technical personnel may flexibly adjust the concentration of the precursor solution or the ratio of the concentration of the reaction mixture according to the needs of the process, and flexibly select the catalytic oxidation of one-component VOCs or multi-component VOCs, the above modifications are still within the scope of the present disclosure.

The basic concepts have been described above, and it is apparent to those skilled in the art that the foregoing detailed disclosure serves only as an example and does not constitute a limitation of the present disclosure. While not expressly stated herein, a person skilled in the art may make various modifications, improvements, and amendments to the present disclosure. Those types of modifications, improvements, and amendments are suggested in the present disclosure, so those types of modifications, improvements, and amendments remain within the spirit and scope of the exemplary embodiments of the present disclosure.

Also, the present disclosure uses specific words to describe embodiments of the present disclosure. Such as "an embodiment", "an embodiment", and/or "some embodiment" means a feature, structure, or characteristic associated with at least one embodiment of the present disclosure. Accordingly, it should be emphasized and noted that two or more references to "one embodiment" or "an embodiment" or "an alternative embodiment" in different places in the present disclosure do not necessarily refer to the same embodiment. In addition, certain features, structures, or characteristics of one or more embodiments of the present disclosure may be suitably combined.

Additionally, unless expressly stated in the claims, the order of the processing elements and sequences, the use of numerical letters, or the use of other names as described herein are not intended to qualify the order of the processes and methods of this disclosure. While some embodiments of the invention that are currently considered useful are discussed in the foregoing disclosure by way of various examples, it is to be understood that such details serve only illustrative purposes, and that additional claims are not limited to the disclosed embodiments, rather, the claims are intended to cover all amendments and equivalent combinations that are consistent with the substance and scope of the embodiments of this disclosure. For example, although the implementation of various components described above may be embodied in a hardware device, it may also be implemented as a software only solution, e.g., an installation on an existing server or mobile device.

Similarly, it should be noted that in order to simplify the presentation of the disclosure of this disclosure, and thereby aid in the understanding of one or more embodiments of the invention, the foregoing descriptions of embodiments of this disclosure sometimes group multiple features together in a single embodiment, accompanying drawings, or in a description thereof. However, this method of disclosure does not imply that more features are required for the objects of the present disclosure than are mentioned in the claims. Rather, claimed subject matter may lie in less than all features of a single foregoing disclosed embodiment.

Some embodiments use numbers describing the number of components, attributes, and it should be understood that such numbers used in the description of embodiments are modified in some examples by the modifiers "approximately," "nearly," "substantially," or "generally" is used in some examples. Unless otherwise noted, the terms "about," or "approximately" indicates that a ±20% variation in the stated number is allowed. Correspondingly, in some embodiments, the numerical parameters used in the present disclosure and claims are approximations, which may change depending on the desired characteristics of individual embodiments. In some embodiments, the numerical parameters should take into account the specified number of valid digits and employ general place-keeping. While the numerical domains and parameters used to confirm the breadth of their ranges in some embodiments of the present disclosure are approximations, in specific embodiments such values are set to be as precise as possible within a feasible range.

For each of the patents, patent applications, patent application disclosures, and other materials cited in the present disclosure, such as articles, books, specification sheets, publications, documents, and the like, are hereby incorporated by reference in their entirety into the present disclosure. Application history documents that are inconsistent with or conflict with the contents of the present disclosure are excluded, as are documents (currently or hereafter appended to the present disclosure) that limit the broadest scope of the claims of the present disclosure. It should be noted that in the event of any inconsistency or conflict between the descriptions, definitions, and/or use of terms in the materials appended to the present disclosure and those set forth herein, the descriptions, definitions and/or use of terms in the present disclosure shall prevail.

Finally, it should be understood that the embodiments described in the present disclosure are only used to illustrate the principles of the embodiments of the present disclosure. Other deformations may also fall within the scope of the present disclosure. As such, alternative configurations of embodiments of the present disclosure may be viewed as consistent with the teachings of the present disclosure as an example, not as a limitation. Correspondingly, the embodiments of the present disclosure are not limited to the embodiments expressly presented and described herein.

What is claimed is:

1. A method for preparing a honeycomb catalyst, wherein
the honeycomb catalyst is used for catalytic oxidative degradation of Volatile Organic Compounds (VOCs), and
the honeycomb catalyst is prepared by an ultrasonic double-atomization process, comprising
step (1) placing honeycomb in nitric acid solution with mass concentration of 5%-15% for acidification for 6-18 h, cleaning and naturally drying the honeycomb after removal from the nitric acid solution, placing the honeycomb in a hydrothermal reactor, adding alcoholic solution for hydrothermal activation, wherein temperature of the hydrothermal activation is 120-180° C., and time of the hydrothermal activation is 6-18 h, naturally drying the honeycomb after performing the hydrothermal activation and removal from the hydrothermal reactor; wherein the honeycomb is attapulgite honeycomb, cordierite honeycomb, mullite, or silicon carbide honeycomb; wherein the alcoholic solution is ethanol solution with mass concentration of 25%-75%;
step (2) dissolving a soluble transition metal inorganic salt in deionized water and stirring thoroughly to obtain a precursor solution; preparing a precipitant solution; performing ultrasonic atomization of the precursor solution and the precipitant solution in an ultrasonic atomization device into droplets, and placing the honeycomb in a quartz glass reactor, wherein the droplets enter into the quartz glass reactor through a pipeline to come into contact with a surface of a honeycomb hole and rapidly react to generate a hydroxide precursor on the surface of the honeycomb hole; wherein the soluble transition metal inorganic salt is cobalt salt, manganese salt, cerium salt, nickel salt, or zinc salt; and
step (3) drying the honeycomb in a drying box after performing the ultrasonic atomization, and calcining the honeycomb in a muffle furnace to obtain a honeycomb catalyst loaded with the transition metal oxide.

2. The method of claim 1, wherein the precipitant solution is ammonia water with concentration of 0.6-4.8 mol/L; a molar concentration ratio between the soluble transition metal inorganic salt and the ammonia water is 1:x, wherein x is between 3 and 12.

3. The method of claim 1, wherein an oscillation frequency of the ultrasonic atomization device in the step (2) is 1.7-2.4 MHz; and time of the ultrasonic atomization is 1-5 h.

4. The method of claim 1, wherein the temperature of the muffle furnace calcination in the step (3) is 300-800° C., a heating rate is 2-5° C./min; calcination time is 1-5 h, and the honeycomb catalyst cooled down to room temperature with the furnace after calcining.

* * * * *